United States Patent
Wei et al.

(10) Patent No.: US 10,502,966 B2
(45) Date of Patent: Dec. 10, 2019

(54) LIQUID CRYSTAL LENS AND DISPLAY DEVICE

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Xiangdong Wei, Beijing (CN); Xue Dong, Beijing (CN); Dan Wang, Beijing (CN); Yun Qiu, Beijing (CN); Lihua Liu, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 0 days.

(21) Appl. No.: 15/568,283

(22) PCT Filed: May 16, 2017

(86) PCT No.: PCT/CN2017/084513
§ 371 (c)(1),
(2) Date: Oct. 20, 2017

(87) PCT Pub. No.: WO2017/215389
PCT Pub. Date: Dec. 21, 2017

(65) Prior Publication Data
US 2018/0210218 A1 Jul. 26, 2018

(30) Foreign Application Priority Data
Jun. 14, 2016 (CN) .......................... 2016 1 0417370

(51) Int. Cl.
*G02B 27/22* (2018.01)
*G02F 1/29* (2006.01)
(Continued)

(52) U.S. Cl.
CPC ... *G02B 27/2214* (2013.01); *G02F 1/133526* (2013.01); *G02F 1/134309* (2013.01);
(Continued)

(58) Field of Classification Search
None
See application file for complete search history.

(56) References Cited

U.S. PATENT DOCUMENTS 9,786,232 B2 * 10/2017 Quan ..................... G09G 3/003
2006/0238685 A1 * 10/2006 Shibasaki ........... G02F 1/13363
349/119
(Continued)

FOREIGN PATENT DOCUMENTS

CN 102062985 A 5/2011
CN 102402096 A 4/2012
(Continued)

OTHER PUBLICATIONS

International Search Report and Written Opinion in PCT/CN2017/084513 dated Aug. 10, 2017, with English translation.
(Continued)

*Primary Examiner* — Ryan Crockett
(74) *Attorney, Agent, or Firm* — Womble Bond Dickinson (US) LLP

(57) ABSTRACT

The present application discloses a liquid crystal lens. The liquid crystal lens comprises: a first electrode; a second electrode; a liquid crystal layer located between the first and the second electrode; a third electrode, located at a side of the first electrode away from the liquid crystal layer; and a driving means. The driving means is configured to: in a 3D
(Continued)

display mode, apply voltages to the first and the second electrode to generate an electric field, such that liquid crystal molecules in the liquid crystal layer are deflected to a first state and form a plurality of lens units, and when switching from the 3D display mode to a 2D display mode, apply voltages to the first and the third electrode to generate an electric field, such that the liquid crystal molecules in the liquid crystal layer are deflected to a second state and form no lens unit.

17 Claims, 4 Drawing Sheets

(51) Int. Cl.
    *G02F 1/1343*     (2006.01)
    *H04N 13/359*     (2018.01)
    *H04N 13/305*     (2018.01)
    *G02F 1/1335*     (2006.01)

(52) U.S. Cl.
    CPC ............. *G02F 1/29* (2013.01); *H04N 13/305* (2018.05); *H04N 13/359* (2018.05); *G02F 2001/291* (2013.01); *G02F 2201/122* (2013.01); *G02F 2203/62* (2013.01)

(56) References Cited

U.S. PATENT DOCUMENTS

| | | | |
|---|---|---|---|
| 2012/0120333 A1* | 5/2012 | Chen | G02B 3/14 349/33 |
| 2013/0215111 A1* | 8/2013 | Yokoyama | G02B 27/2214 345/419 |
| 2013/0300994 A1* | 11/2013 | Wu | G02F 1/133753 349/129 |
| 2014/0111753 A1 | 4/2014 | Kobayashi et al. | |
| 2016/0103373 A1 | 4/2016 | Xi et al. | |

FOREIGN PATENT DOCUMENTS

| | | |
|---|---|---|
| CN | 103235462 A | 8/2013 |
| CN | 103777404 A | 5/2014 |
| CN | 104122718 A | 10/2014 |
| CN | 104280952 A | 1/2015 |
| CN | 105388678 A | 3/2016 |
| CN | 105842951 A | 8/2016 |
| KR | 1020130060599 A | 6/2013 |

OTHER PUBLICATIONS

Office Action in Chinese Application No. 201610417370.4 dated Aug. 23, 2017, with English translation.
"Second office action," CN Application No. 201610417370.4 (dated Apr. 28, 2018).

* cited by examiner

LIQUID CRYSTAL LENS AND DISPLAY DEVICE

RELATED APPLICATION

The present application is the U.S. National Phase Entry of PCT/CN2017/084513, with an international filing date of May 16, 2017, which claims priority of the Chinese Patent Application No. 201610417370.4 filed on Jun. 14, 2016, all contents of which are incorporated herein by reference.

TECHNICAL FIELD

The present application relates to the field of display technology, particularly, to a liquid crystal lens and a display device.

BACKGROUND

With the rapid development of the display technology, naked eye three dimensional (3D) display devices have become more and more popular. By arranging a liquid crystal lens at a light exit side of the display panel so as to use the liquid crystal lens to form several fields of view at the light exit side of the display panel, light emitted from different sub-pixels of the display panel will fall within different fields of view. In this way, the left eye and the right eye of a viewer can view images in different fields of view respectively without having to wear special devices, so as to realize naked eye 3D display.

Typically, the liquid crystal lens comprises an upper substrate, a lower substrate, and a liquid crystal layer arranged between the two substrates. A strip electrode is arranged at a side of the upper substrate close to the liquid crystal layer, and a plate electrode is arranged at a side of the lower substrate close to the liquid crystal layer. In a 3D display mode, different voltages are applied to strip electrodes arranged at different positions, so as to generate different electric field intensities between the upper substrate and the lower substrate. In this case, liquid crystal molecules at different positions are deflected to different degrees, thereby forming a plurality of lens units. In a two dimensional (2D) display mode, voltages are applied to the strip electrode and the plate electrode, and the liquid crystal molecules arranged therebetween are not deflected. Thereby, no lens unit is formed, i.e., no regulating function is imposed on the incident polarized light.

Also conventionally, the 3D display mode is switched to the 2D display mode by stopping applying voltages to the strip electrode and the plate electrode so as to enable the liquid crystal molecules to be relaxed to the initial state slowly by means of their own elasticity. However, due to factors such as a capacitance between the liquid crystal molecules and a rotation viscosity of the liquid crystal molecules, the display device switches from the 3D display mode to the 2D display mode at a relatively low switching response speed.

SUMMARY

The present application provides a liquid crystal lens and a display device comprising the liquid crystal lens, which can switch from a 3D display mode to a 2D display mode quickly.

According to one aspect of the present application, a liquid crystal lens is provided, comprising: a first electrode; a second electrode arranged opposite to the first electrode; a liquid crystal layer located between the first electrode and the second electrode; a third electrode, located at a side of the first electrode away from the liquid crystal layer; and a driving means. The driving means is configured to: in a 3D display mode, apply voltages to the first electrode and the second electrode to generate an electric field, such that liquid crystal molecules in the liquid crystal layer are deflected to a first state and form a plurality of lens units; and when switching from the 3D display mode to a 2D display mode, apply voltages to the first electrode and the third electrode to generate an electric field, such that the liquid crystal molecules in the liquid crystal layer are deflected to a second state and form no lens unit.

According to an embodiment of the present application, the first electrode and the second electrode can be multidomain electrodes.

According to an embodiment of the present application, the liquid crystal lens can further comprise an optical retardation film arranged at a light exit side of the liquid crystal lens.

According to an embodiment of the present application, an insulating layer can be formed between the first electrode and the third electrode.

According to an embodiment of the present application, the liquid crystal lens can further comprise a first substrate and a second substrate arranged opposite to each other. The third electrode can be arranged at a side of the first substrate close to the liquid crystal layer. The second electrode can be arranged at a side of the second substrate close to the liquid crystal layer.

According to an embodiment of the present application, the first substrate and the second substrate can be transparent substrates, and the first to third electrodes can be transparent electrodes.

According to an embodiment of the present application, the third electrode can be a plate electrode, and the first electrode and the second electrode can be strip electrodes.

According to an embodiment of the present application, the first electrode and the second electrode can be dual-domain electrodes.

According to the other aspect of the present application, a display device is provided, comprising: a display panel; and a liquid crystal lens according to the present application. The liquid crystal lens is arranged at a light exit side of the display panel.

According to an embodiment of the present application, in a 3D display mode, each lens unit in the liquid crystal lens corresponds to a row of sub-pixels in the display panel; or each lens unit in the liquid crystal lens corresponds to a column of sub-pixels in the display panel.

The liquid crystal lens and the display device comprising the liquid crystal lens according to the present application, in a 3D display mode, apply voltages to the first electrode and the second electrode of the liquid crystal lens to generate an electric field, such that liquid crystal molecules in the liquid crystal layer form a plurality of lens units, and when switching from the 3D display mode to a 2D display mode, apply voltages to the first electrode and the third electrode to generate an electric field, such that the liquid crystal molecules in the liquid crystal layer form no lens unit. Compared to a conventional approach where applications of voltages to the electrodes are stopped such that liquid crystal molecules are relaxed to the initial state slowly by means of their own elasticity, the liquid crystal molecules can be deflected to a state where no lens unit is formed quickly under the effect of the electric field. Hence, the switching response speed from the 3D display mode to the 2D display mode is improved.

BRIEF DESCRIPTION OF THE DRAWINGS

In order to explain the technical solutions in embodiments of the present application more clearly, the drawings that show the embodiments of the present application will be described below. It should be recognized that the drawings described below only show some exemplary embodiments of the present application, rather than limiting the scope of the present application. In the drawings, FIG. 1 schematically shows a structure of a liquid crystal lens according to an embodiment of the present application.

DETAILED DESCRIPTION OF THE EMBODIMENTS

In order to enable the objects, technical solutions and advantages of the present application to be clearer, next, the embodiments of the present application will be described in more details in conjunction with the drawings.

Figure 1:
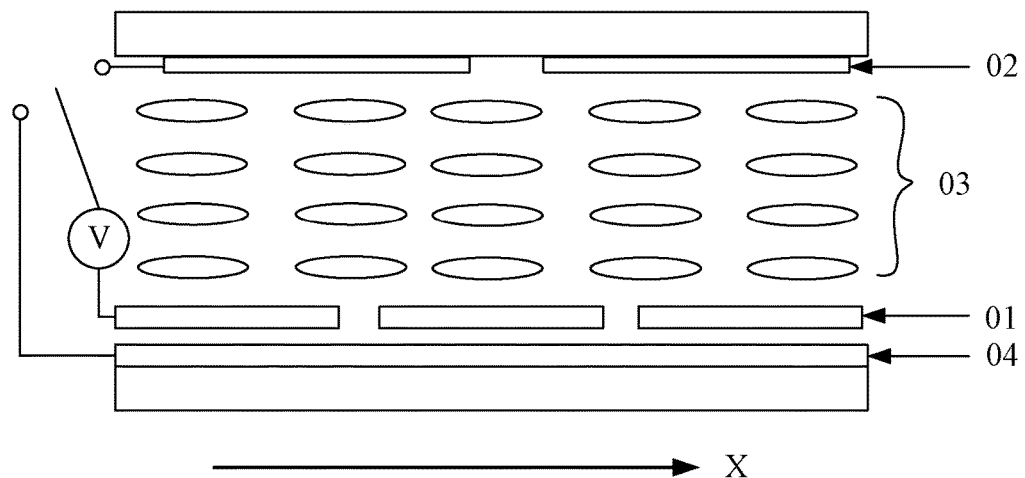
Figure 2:
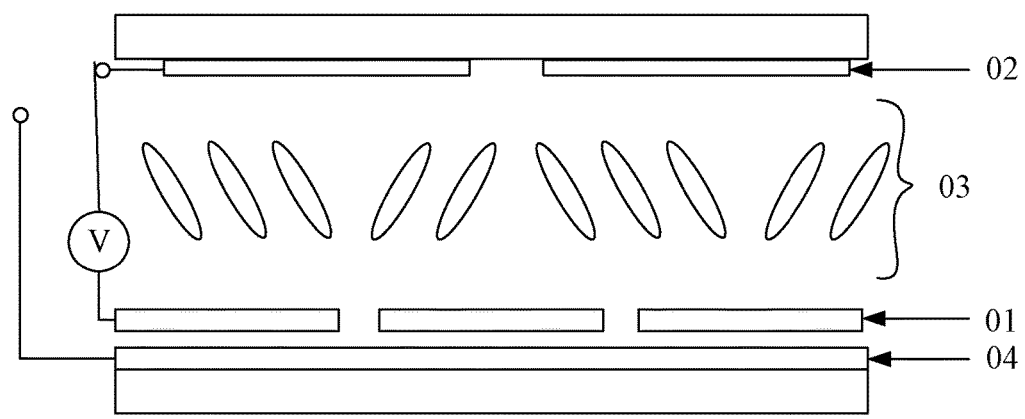
FIG. 2 schematically shows a structure of a liquid crystal lens in a 3D display mode according to an embodiment of the present application.
Figure 3:
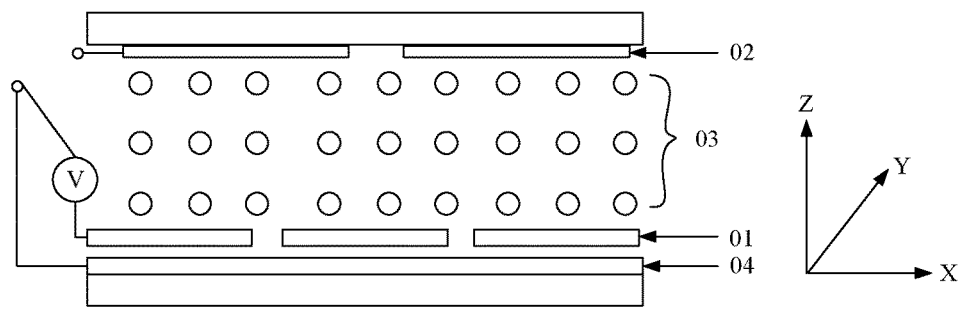
FIG. 3 schematically shows a structure of a liquid crystal lens when switching from the 3D display mode to a 2D display mode according to an embodiment of the present application.

FIG. 1 schematically shows a structure of a liquid crystal lens according to an embodiment of the present application, FIG. 2 schematically shows a structure of a liquid crystal lens in a 3D display mode according to an embodiment of the present application, and FIG. 3 schematically shows a structure of a liquid crystal lens when switching from the 3D display mode to a 2D display mode according to an embodiment of the present application.

As shown in FIG. 1, the liquid crystal lens according to an embodiment of the present application can comprise: a first electrode 01; a second electrode 02 arranged opposite to the first electrode 01; a liquid crystal layer 03 located between the first electrode 01 and the second electrode 02; and a third electrode 04 formed at a side of the first electrode 01 away from the liquid crystal layer 03. In addition, the liquid crystal lens according to an embodiment of the present application can further comprise a driving means for applying voltages to the first electrode 01 and the second electrode 02 in a 3D display mode, or applying voltages to the first electrode 01 and the third electrode 04 when switching from the 3D display mode to a 2D display mode.

Referring to FIG. 2, in the 3D display mode, the driving means applies voltages to the first electrode 01 and the second electrode 02 to generate an electric field, such that liquid crystal molecules in the liquid crystal layer 03 are deflected to a first state and form a plurality of lens units. Each lens unit can serve as a lens for the incident polarized light.

Referring to FIG. 3, when switching from the 3D display mode to the 2D display mode, the driving means applies voltages to the first electrode 01 and the third electrode 04 to generate an electric field, such that the liquid crystal molecules in the liquid crystal layer 03 are deflected to a second state and form no lens unit. The liquid crystal molecules in the second state do not impose a regulating function on the incident polarized light.

Although the driving means is shown as a switch element in FIG. 1 to FIG. 3, the present application is not limited to this. The skilled person in the art can carry out various types of driving means having the same function as the driving means of the present application according to the teaching of the present application specifically.

To sum up, the liquid crystal lens according to an embodiment of the present application, when switching from the 3D display mode to the 2D display mode, applies voltages to the first electrode and the third electrode to generate an electric field, such that the liquid crystal molecules in the liquid crystal layer are deflected to the second state in which no lens unit is formed. Compared to a conventional approach where applications of voltages to the electrodes are stopped such that the liquid crystal molecules are relaxed to the initial state slowly by means of their own elasticity, the liquid crystal molecules can be deflected to a state where no lens unit is formed quickly under the effect of the electric field. Hence, the switching response speed from the 3D display mode to the 2D display mode is improved.

According to an embodiment of the present application, when it is required to switch from the 2D display mode to the 3D display mode, the driving means can apply voltages to the first electrode 01 and the second electrode 02 again to generate an electric field, so as to enable the liquid crystal molecules in the liquid crystal layer 03 to be defected to the first state again and form a plurality of lens unit, thus realizing 3D display mode.

According to an embodiment of the present application, the liquid crystal molecules in the liquid crystal layer 03 can be negative liquid crystals. The negative liquid crystals refer to liquid crystal molecules whose dielectric constant in the long axis direction is smaller than the dielectric constant in the short axis direction. The liquid crystal molecules in the liquid crystal layer 02 can comprise the following several states: as shown in FIG. 1, when no electric field is applied between the first electrode 01 and the second electrode 02, and no electric field is applied between the first electrode 01 and the third electrode 04 either, the liquid crystal molecules in the liquid crystal layer 03 can be in an initial state. In the initial state, the long axis direction of the liquid crystal molecules can be parallel to a plane where the electrode plate is located. For example, the long axis direction of the liquid crystal molecules in the initial state can be x direction. As shown in FIG. 2, in the 3D display mode (i.e., when applying voltages to the first electrode 01 and the second electrode 02), the liquid crystal molecules in the liquid crystal layer 03 can be deflected to a first state under the effect of the electric field and form a lens unit. As shown in FIG. 3, when switching from the 3D display mode to the 2D display mode (i.e., applying voltages to the first electrode 01 and the third electrode 04), the liquid crystal molecules in the liquid crystal layer 03 can be deflected to a second state under the effect of the electric field, the along axis direction of the liquid crystal molecules in the second state can be parallel to a plane where the electrode plate is located, and the long axis direction of the liquid crystal molecules in the initial state and the long axis direction of the liquid crystal molecules in the second state are perpendicular to each other. For example, the long axis direction of the liquid crystal molecules in the second state can be y direction, and the x direction and the y direction are perpendicular to each other. Also, the x direction and the y direction are both perpendicular to the thickness direction of the liquid crystal lens, i.e., z direction. Because the long axis direction of the liquid crystal molecules is parallel to a plane where the electrode plate is located in both of the initial state and the second state, no regulating function is imposed on the incident polarized light. The polarized light is thus not deflected after passing through the liquid crystal layer. Here, it is in the 2D display mode.

On the other hand, when the liquid crystal molecules used in the liquid crystal lens are positive liquid crystals, the long axis direction of the liquid crystal molecules in the initial state can be perpendicular to a plane where the electrode plate is located.

According to an embodiment of the present application, the third electrode 04 is a plate electrode, and the first electrode 01 and the second electrode 02 can comprise a plurality of strip electrodes respectively. According to an embodiment of the present application, the first electrode 01 and the second electrode 02 can be multidomain electrodes, for example, dual-domain electrodes. The multidomain electrode means that the electrode can comprise a plurality of different extending directions, thereby being capable of enabling liquid crystal molecules corresponding to the position of one same electrode to be deflected along different directions.

Figure 4:
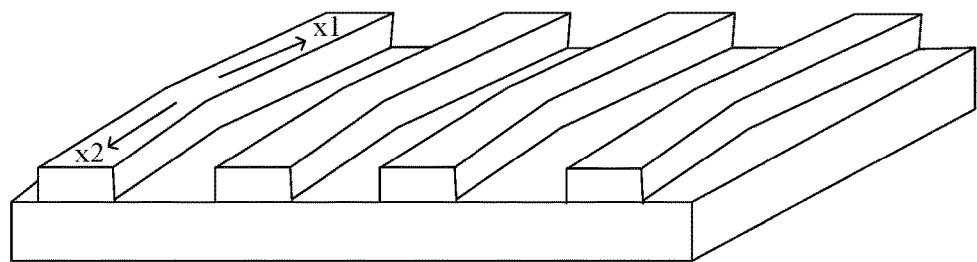
FIG. 4 schematically shows a structure of a dual-domain electrode that can be applied in a liquid crystal lens according to an embodiment of the present application.
Figure 5:
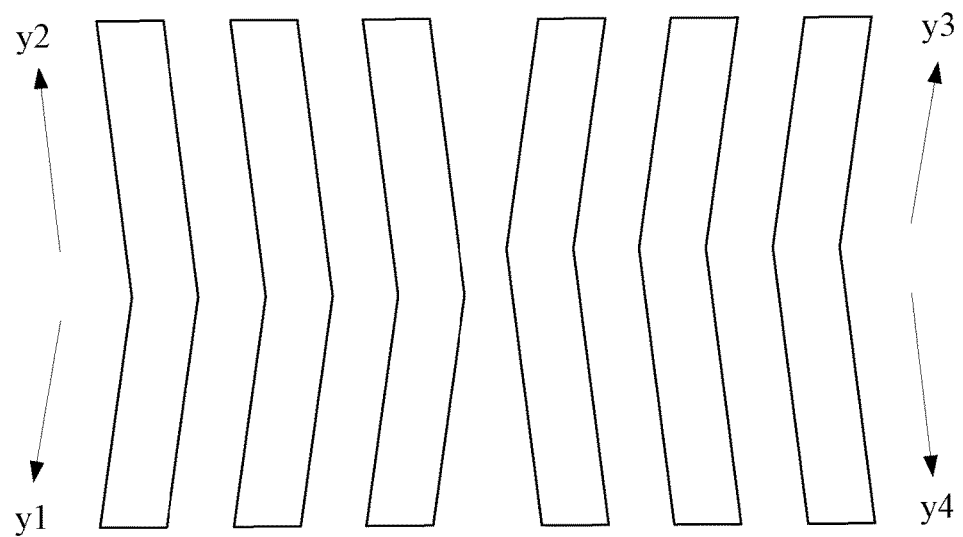
FIG. 5 schematically shows a structure of a four-domain electrode that can be applied in a liquid crystal lens according to an embodiment of the present application.

FIG. 4 schematically shows a structure of a dual-domain electrode that can be applied in a liquid crystal lens according to an embodiment of the present application. FIG. 5 schematically shows a structure of a four-domain electrode that can be applied in a liquid crystal lens according to an embodiment of the present application.

As shown in FIG. 4, the dual-domain electrode can comprise two different extending directions x1 and x2. As shown in FIG. 5, the four-domain electrode can comprise four different extending directions y1 to y4.

In a conventional approach, electrodes used in the liquid crystal lens are single-domain electrodes. That is, the liquid crystal molecules can only be deflected along one direction, and each lens unit formed by deflection of the liquid crystal molecules corresponds to two columns (or two rows) of sub-pixels in the display panel. Each lens unit enables the image displayed on sub-pixels of the odd column (or row) to be seen by the left eye, and enables the image displayed on sub-pixels of the even column (or row) to be seen by the right eye. Hence, the resolution of the display device in the 3D display mode is reduced by half as compared to the 2D display mode.

Figure 6:
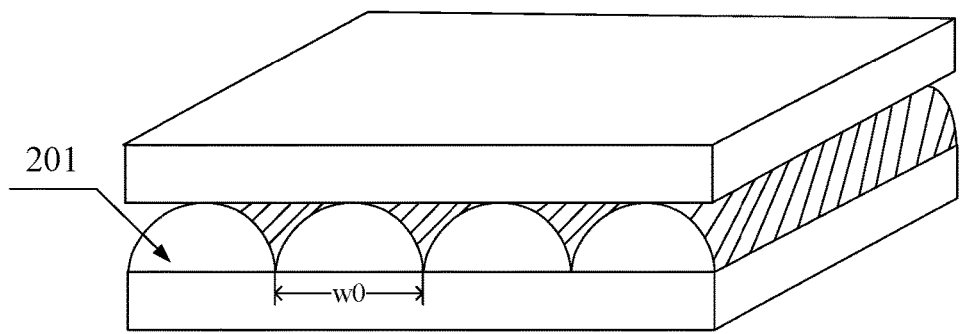
FIG. 6 schematically shows a structure of a lens unit in a liquid crystal lens according to an embodiment of the present application.

According to an embodiment of the present application, multidomain electrodes are used in the liquid crystal lens as the first electrode and the second electrode. Because each electrode can extend along at least two directions, the liquid crystal molecules corresponding to one same electrode position can be deflected along at least two directions. Hence, in the 3D display mode, each lens unit formed in the liquid crystal lens using multidomain electrodes has a smaller width, as shown in FIG. 6. Each lens unit 201 with a smaller width w0 can correspond to a column (or row) of sub-pixels in the display panel, such that the resolution in the 3D display mode is the same as the resolution in the 2D display mode. Thereby, the 3D display effect of the display device is improved, and problems in the conventional approaches, such as fuzzy picture caused by low resolution of the display device in the 3D display mode, display only at a fixed visual angle, and dizziness caused by long time view. According to an embodiment of the present application, the width direction of the lens unit 201 is parallel to the arrangement direction of each stripe electrode.

Figure 7:
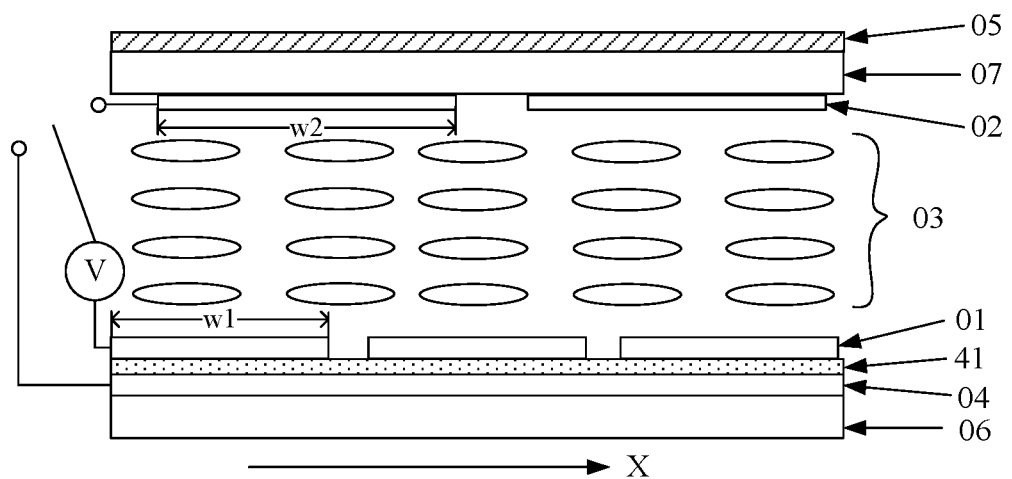
FIG. 7 schematically shows a structure of a liquid crystal lens according to another embodiment of the present application.

FIG. 7 schematically shows a structure of the liquid crystal lens according to another embodiment of the present application.

As shown in FIG. 7, the width w1 of each strip electrode in the first electrode 01 can be smaller than the width w2 of each strip electrode in the second electrode 02, and the width direction of each strip electrode is parallel to the arrangement direction of each strip electrode. In addition, the liquid crystal lens according to this embodiment can further comprise an optical retardation film 05 arranged at its light exit side. According to an embodiment of the present application, when the second electrode 02 is located at a light exit side of the first electrode 01, the optical retardation film 05 can be arranged at the light exit side of the second electrode 02. When the first electrode 01 is located at a light exit side of the second electrode 02, the optical retardation film 05 can be arranged at the light exit side of the first electrode 01.

In the 3D display mode, after the incident polarized light passes through each lens unit, the polarized light will be delayed in phase. Also, because the liquid crystal molecules are optical anisotropic materials, the birefringent property of the liquid crystal molecules would enable the incident polarized light to generate distortion and generate elliptically polarized light, thereby causing the contrast ratio of the display device to be reduced or the visual angle to be narrowed. The phase delay and distortion of the polarized light can be compensated by arranging an optical retardation film at the light exit side of the liquid crystal lens, so as to improve the display effect in the 3D display mode. According to an embodiment of the present application, the optical retardation film can be made from poly-carbonate or PVA film via stretching.

As shown in FIG. 7, an insulating layer 41 is formed between the first electrode 01 and the third electrode 04, so as to avoid mutual influences between the first electrode 01 and the third electrode 04. In addition, the liquid crystal lens can further comprise a first substrate 06 and a second substrate 07 arranged opposite to each other. The third electrode 04 is arranged at a side of the first substrate 06 close to the liquid crystal layer 03. The second electrode 02 is arranged at a side of the second substrate 07 close to the liquid crystal layer 03. According to an embodiment of the present application, the first substrate 06 and the second substrate 07 are transparent substrates, and the first electrode 01, the second electrode 02 and the third electrode 04 are transparent electrodes. The optical retardation film 05 can be arranged at a light exit side of the second substrate 07.

Figure 8:
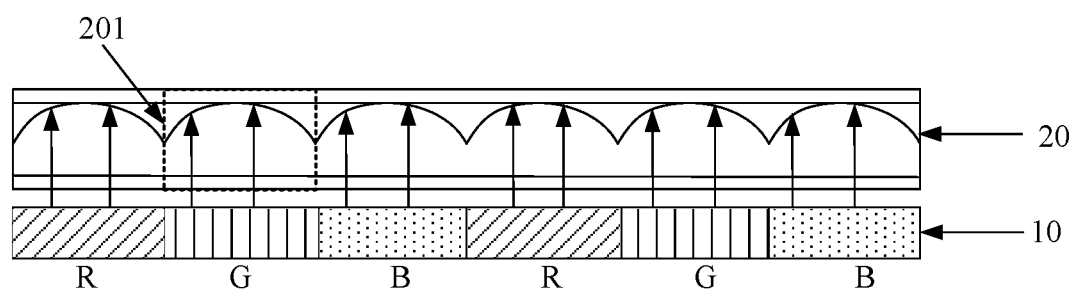
FIG. 8 schematically shows a structure of a display device comprising a liquid crystal lens according to an embodiment of the present application.

FIG. 8 schematically shows a structure of a display device comprising a liquid crystal lens according to an embodiment of the present application.

As shown in FIG. 8, the display device according to an embodiment of the present application can comprise a display panel 10 and a liquid crystal lens 20 arranged at a light exit side of the display panel 10. The liquid crystal lens 20 can be one of the liquid crystal lenses described with reference to FIG. 1 to FIG. 3 and FIG. 7.

According to an embodiment of the present application, in the 3D display mode, each lens unit 201 in the liquid crystal lens 20 corresponds to a column (or a row) of sub-pixels in the display panel 10. For example, as shown in FIG. 8, each pixel in the display panel 10 comprises three sub-pixels R, G and B, and each lens unit 201 can correspond to a column (or a row) of sub-pixels (e.g., red sub-pixel R, green sub-pixel G or blue sub-pixel B) respectively.

In the display device according to an embodiment of the present application, in the 3D display mode, each lens unit in the liquid crystal lens corresponds to a column (or a row) of sub-pixels in the display panel. Hence, the resolution of the display device in the 3D display mode can be same as the resolution in the 2D display mode, so as to solve problems in the conventional approaches where the resolution of the display device in the 3D display mode is relatively low.

What are stated above are only preferred embodiments of the present application, which are not used for limiting the present application. Any modifications, equivalent replacements, and improvements made within the spirit and the principle of the present application should be encompassed within the protection scope of the present application.

The invention claimed is:

1. A liquid crystal lens, comprising:
    a first electrode electrically connected with a voltage source;
    a second electrode arranged opposite to the first electrode;
    a liquid crystal layer located between the first electrode and the second electrode;
    a third electrode, located at a side of the first electrode away from the liquid crystal layer; and
    a switch element electrically connected with the voltage source,
    wherein the switch element has a first terminal electrically connected to the first electrode via the voltage source, a second terminal electrically connected with the second electrode, and a third terminal electrically connected with the third electrode,
    wherein the switch element is configured to:
    in a 3D display mode, connect the first terminal with the second terminal so as to apply voltages to the first electrode and the second electrode to generate an electric field, such that liquid crystal molecules in the liquid crystal layer are deflected to a first state and form a plurality of lens units, and
    when switching from the 3D display mode to a 2D display mode, connect the first terminal with the third terminal so as to apply voltages to the first electrode and the third electrode to generate an electric field, such that the liquid crystal molecules in the liquid crystal layer are deflected to a second state and form no lens unit,
    wherein the first electrode comprises a plurality of first strip sub-electrodes arranged in parallel with each other in a first direction, the second electrode comprises a plurality of second strip sub-electrodes arranged in parallel with each other in the first direction, and a width of each of the first strip sub-electrodes in the first direction is smaller than a width of each of the second strip sub-electrodes in the first direction.

2. The liquid crystal lens according to claim 1, wherein the first electrode and the second electrode are multidomain electrodes.

3. The liquid crystal lens according to claim 2, wherein the first electrode and the second electrode are dual-domain electrodes.

4. The liquid crystal lens according to claim 1, further comprising:
    an optical retardation film arranged at a light exit side of the liquid crystal lens.

5. The liquid crystal lens according to claim 1, wherein an insulating layer is formed between the first electrode and the third electrode.

6. The liquid crystal lens according to claim 1, further comprising a first substrate and a second substrate arranged opposite to each other, wherein
    the third electrode is arranged at a side of the first substrate close to the liquid crystal layer, and the second electrode is arranged at a side of the second substrate close to the liquid crystal layer.

7. The liquid crystal lens according to claim 6, wherein the first substrate and the second substrate are transparent substrates, and the first to third electrodes are transparent electrodes.

8. The liquid crystal lens according to claim 1, wherein the third electrode is a plate electrode.

9. A display device, comprising:
    a display panel; and
    a liquid crystal lens according to claim 1, the liquid crystal lens being arranged at a light exit side of the display panel.

10. The display device according to claim 9, wherein in the 3D display mode, each lens unit in the liquid crystal lens corresponds to a row of sub-pixels in the display panel; or
    each lens unit in the liquid crystal lens corresponds to a column of sub-pixels in the display panel.

11. The display device according to claim 9, wherein the first electrode and the second electrode are multidomain electrodes.

12. The display device according to claim 11, wherein the first electrode and the second electrode are dual-domain electrodes.

13. The display device according to claim 9, further comprising:
    an optical retardation film arranged at a light exit side of the liquid crystal lens.

14. The display device according to claim 9, wherein an insulating layer is formed between the first electrode and the third electrode.

15. The display device according to claim 9, further comprising a first substrate and a second substrate arranged opposite to each other, wherein
    the third electrode is arranged at a side of the first substrate close to the liquid crystal layer, and the second electrode is arranged at a side of the second substrate close to the liquid crystal layer.

16. The display device according to claim 15, wherein the first substrate and the second substrate are transparent substrates, and the first to third electrodes are transparent electrodes.

17. The display device according to claim 9, wherein the third electrode is a plate electrode, and the first electrode and the second electrode are strip electrodes.

* * * * *